US006751066B1

United States Patent
Warmka et al.

(10) Patent No.: US 6,751,066 B1
(45) Date of Patent: Jun. 15, 2004

(54) DISC DRIVE DATA STORAGE SYSTEM AND LOAD BEAM HAVING IMPROVED CAPTURES FOR ROUTING HEAD WIRE AND TUBE ASSEMBLY

(75) Inventors: Scott Robert Warmka, Edmond, OK (US); David Daniel Backlund, Hanover, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 821 days.

(21) Appl. No.: 09/141,183

(22) Filed: Aug. 27, 1998

Related U.S. Application Data
(60) Provisional application No. 60/057,138, filed on Sep. 28, 1997.

(51) Int. Cl.[7] .................................................. G11B 5/48
(52) U.S. Cl. ................................................... 360/245.8
(58) Field of Search .............................. 360/104, 245.8, 360/244.9, 244.8, 244.5

(56) References Cited

U.S. PATENT DOCUMENTS

| | | | | |
|---|---|---|---|---|
| 4,829,395 A | * | 5/1989 | Coon et al. ................. 360/104 |
| 5,003,420 A | * | 3/1991 | Hinlein ....................... 360/104 |
| 5,012,368 A | * | 4/1991 | Bosier et al. ............... 360/104 |
| 5,027,239 A | | 6/1991 | Hagen ........................ 360/104 |
| 5,237,472 A | * | 8/1993 | Morehouse et al. ........ 360/105 |
| 5,296,984 A | * | 3/1994 | Fick ............................ 360/104 |
| 5,311,384 A | * | 5/1994 | Johnson ..................... 360/104 |
| 5,495,377 A | | 2/1996 | Kim ............................ 360/106 |
| 5,572,387 A | | 11/1996 | Brooks, Jr. et al. ......... 360/104 |
| 5,585,979 A | * | 12/1996 | Erpelding et al. .......... 360/104 |
| 5,610,785 A | * | 3/1997 | Aoyagi et al. ............. 360/104 |
| 5,623,758 A | | 4/1997 | Brooks, Jr. et al. ...... 29/603.01 |
| 5,877,923 A | * | 3/1999 | Khan et al. ................. 360/104 |

\* cited by examiner

*Primary Examiner*—Brian E. Miller
(74) *Attorney, Agent, or Firm*—Westman, Champlin & Kelly, P.A.

(57) ABSTRACT

A load beam and a disc drive data storage system using the same are disclosed. The load beam includes a resilient section adapted for attachment to a support arm, and a substantially rigid section coupled to the resilient section and coupleable to a gimbal. The resilient and rigid load beam sections are separated by a preload bend. A first slide capture is included on the rigid load beam section and is adapted to slidably secure a conductor sleeve to the rigid section such that the sleeve can move longitudinally therethrough. The first slide capture substantially constrains conductor sleeve movement orthogonal to longitudinal movement. A first longitudinal inhibiting capture is included on the resilient load beam section and is adapted to secure the sleeve to the resilient section such that longitudinal displacement of the conductor sleeve proximate the firsts longitudinal inhibiting capture is constrained.

18 Claims, 4 Drawing Sheets

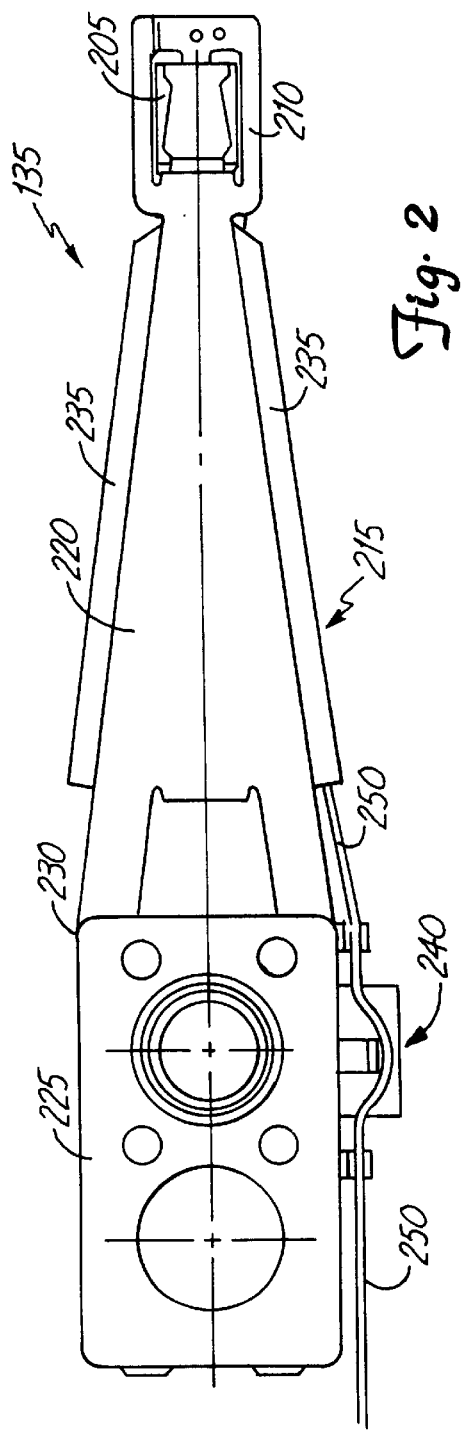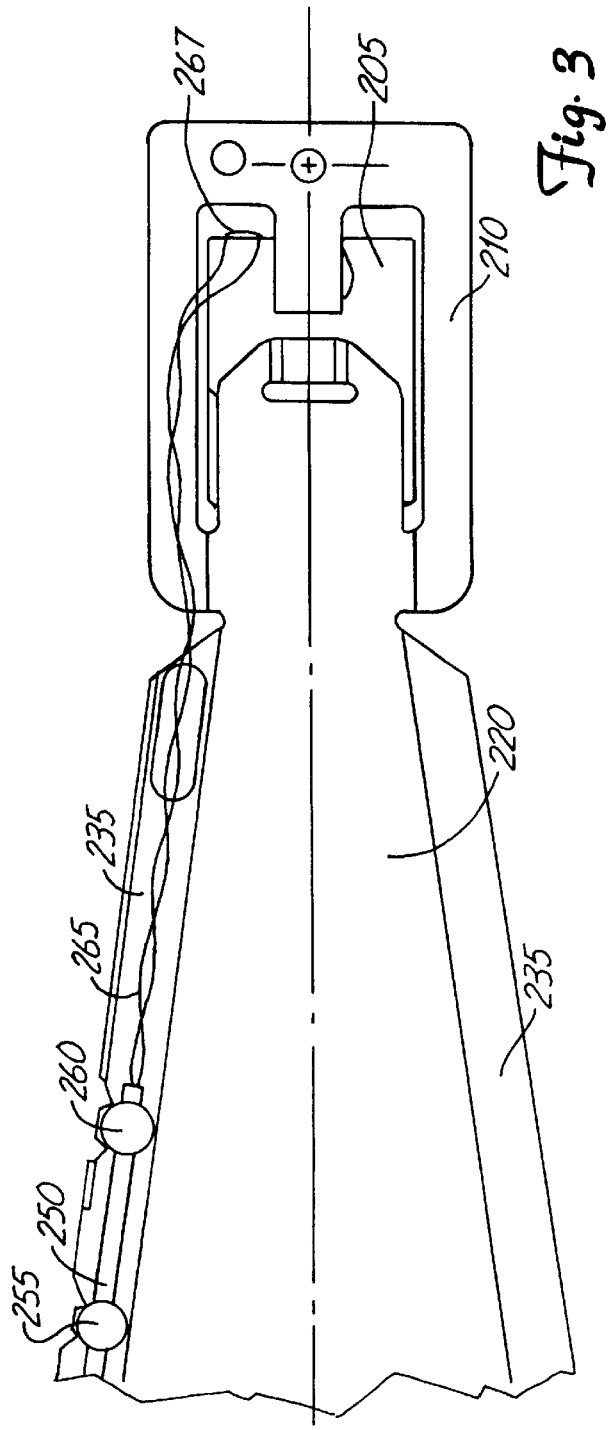

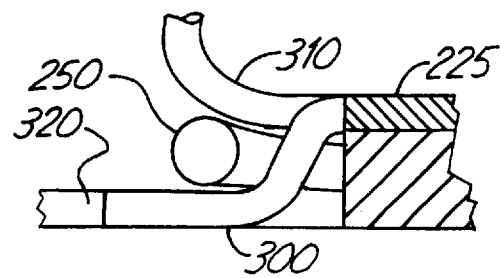
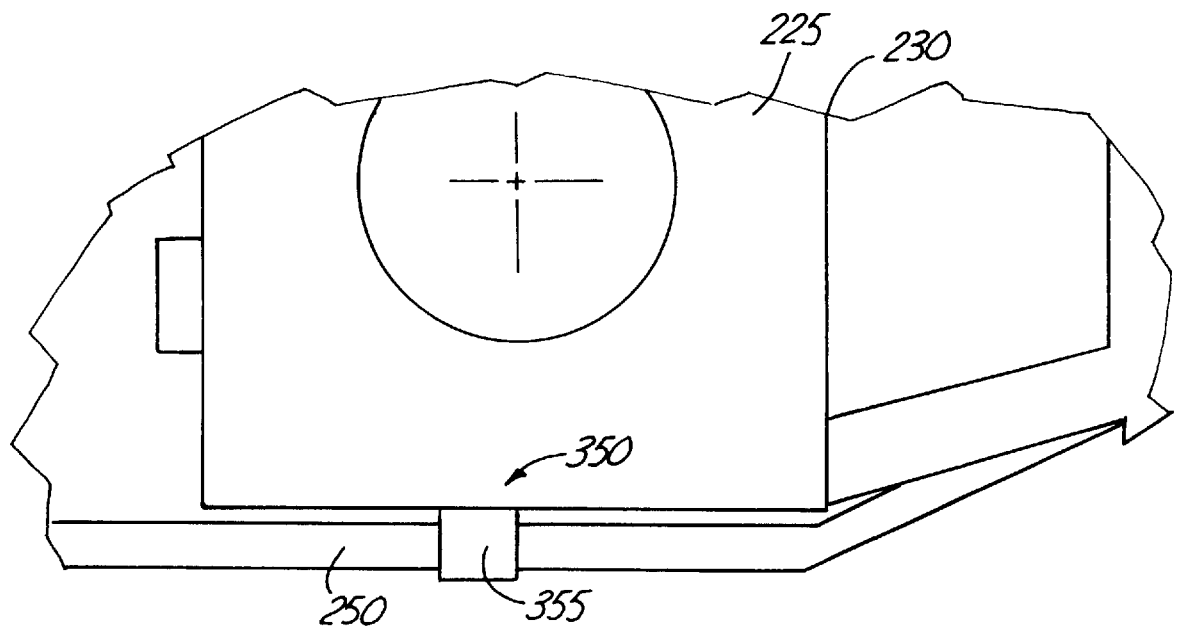

DISC DRIVE DATA STORAGE SYSTEM AND LOAD BEAM HAVING IMPROVED CAPTURES FOR ROUTING HEAD WIRE AND TUBE ASSEMBLY

The present application claims the benefit of earlier filed U.S. Provisional Application Serial No. 60/057,138, entitled CAPTURES FOR ROUTING A HEAD WIRE AND TUBE ASSEMBLY IN A DISC DRIVE, filed on Aug. 28, 1997.

BACKGROUND OF THE INVENTION

The present invention relates generally to disc drive data storage systems. More particularly, the present invention relates to head gimbal assemblies (HGAs) and capture configurations for routing conductors and a protective sleeve across a load beam of an HGA.

HGAs used in disc drive data storage systems typically include three components, a slider, a gimbal and a load beam. The slider includes a hydrodynamic air bearing surface (ABS) and a transducer for reading information from and/or writing information to a spinning data storage disc. The gimbal is attached to the slider and is resilient in the pitch and roll directions of the slider as it follows the topography of the disc. The gimbal is rigid in the yaw and in the in-plane directions, thereby enabling precise slider and transducer positioning over the disc.

The load beam is attached to a support arm and to the gimbal. The load beam is resilient in the vertical direction as the slider follows the topography of the disc, and is rigid in the in-plane directions to enable precise slider and transducer positioning. The load beam includes a preload bend to apply a force, to the gimbal and slider, which opposes the hydrodynamic lifting force developed by the slider's ABS when proximate the spinning disc. Typically, the load beam is mounted on a base plate, which is then attached to the support arm.

A number of HGAs are combined to create a head-stack assembly in a single disc drive. Electrical signals are sent to and received from each transducer via conductor wires routed between the slider and support arm. The wires are placed inside of a flexible tube or sleeve to protect them and to simplify hand routing. Typically, the protective sleeve is secured to the load beam by bendable metal tabs. For example, load beams typically include at least one tab or capture, referred to as a load beam tab or capture, on the substantially rigid section of the load beam between the preload bend and the slider. Load beams also typically include at least one tab or capture, referred to as a base plate tab or capture, formed on the resilient section of load beam which is attached via a base plate the support arm. In current HGA designs, the protective conductor sleeve is longitudinally constrained (i.e., held against longitudinal displacement or pulling out) by the load beam captures on the rigid section of the load beam. Typically, the base plate captures allow longitudinal displacement or slipping of the sleeve, but constrain the sleeve from moving in all directions orthogonal to the longitudinal direction.

A problem with existing HGA conductor sleeve capture configurations is that the base plate captures on the load beam, which typically allow longitudinal displacement of the protective sleeve, do not isolate the sleeve section located near the preload bend of the load beam from tension and compression forces induced during handling of the HGA. For example, while attaching the load beam to the support arm using the base plate, significant tension and compression forces can be exerted on the protective sleeve. These forces can change the applied preload force of the HGA.

The present invention provides a solution to this and other problems, and offers other advantages over the prior art.

SUMMARY OF THE INVENTION

In accordance with one embodiment of the invention, a load beam and a disc drive data storage system using the same are disclosed. The load beam includes a resilient section adapted for attachment to a support arm, and a substantially rigid section coupled to the resilient section and coupleable to a gimbal. The resilient and rigid load beam sections are separated by a preload bend. A first slide capture is included on the rigid load beam section and is adapted to slidably secure a conductor sleeve to the rigid section such that the sleeve can move longitudinally therethrough. The first slide capture substantially constrains conductor sleeve movement orthogonal to longitudinal movement. A first longitudinal inhibiting capture is included on the resilient load beam section and is adapted to secure the sleeve to the resilient section such that longitudinal displacement of the conductor sleeve proximate the first longitudinal inhibiting capture is constrained.

These and various other features as well as advantages which characterize the present invention will be apparent upon reading of the following detailed description and review of the associated drawings.

BRIEF DESCRIPTION OF THE DRAWINGS

FIG. 2 is a top view of a head gimbal assembly implementing a first embodiment of the improved capture configuration of the present invention.

FIG. 3 is a top view of a portion of the head gimbal assembly illustrated in FIG. 2, illustrating aspects of the present invention in greater detail.

FIG. 6 is a diagrammatic illustration showing the weave capture illustrated in FIG. 5 in greater detail.

FIG. 7 is a diagrammatic illustration of a portion of a base plate attachment section of the load beam having a longitudinally constraining crimp capture incorporated thereon.

DETAILED DESCRIPTION OF THE PREFERRED EMBODIMENTS

Figure 1:
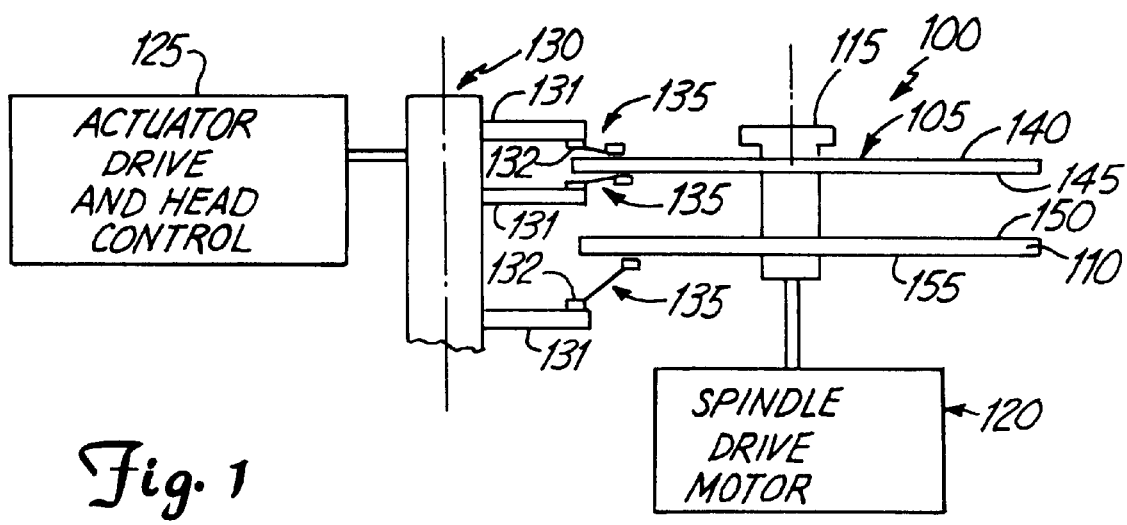
FIG. 1 is a block diagram of a disc drive data storage system having an improved capture configuration for routing head wires and their supporting sleeve across a load beam in accordance with the present invention.

Referring now to FIG. 1, data storage system or apparatus 100 is shown. Disc drive 100 includes discs 105 and 110, spindle 115, spindle drive motor 120, actuator drive and head control circuitry 125, actuator assembly 130 and HGAs 135. Each HGA 135 includes a head slider, a gimbal attached to the head slider, and a load beam attached to the gimbal and attached via a base plate 132 to a support arm 131 of actuator assembly 130. HGAs 135 include an improved capture design for routing a head wire and protective tube or sleeve for electrically connecting the head sliders to external circuitry such as circuitry 125. An HGA 135 according to the present invention is illustrated in greater detail in FIGS. 2–7.

Discs 105 and 110 are mounted on spindle 115. During rotation of spindle 115 and discs 105 and 110 by spindle drive motor 120, actuator drive and head control circuit 125 controls movement of actuator assembly 130 to position the data heads of HGAs 135 over desired positions on disc surfaces 140, 145, 150 and 155. Depending upon which of disc surfaces 140, 145, 150 and 155 is to be written to or read from, a selected one of the transducer containing data heads of HGAs 135 reads/writes data from/to the desired disc surface. It must be understood that, while disc drive 100 is illustrated with two discs and specific circuit functions or components, disc drive 100 can include more or less discs and other circuitry.

FIGS. 2 and 3 illustrate one embodiment of HGA 135 of the present invention in greater detail. HGA 135 includes transducer carrying slider 205 (also referred to as a head slider), gimbal 210 attached to and supporting slider 205, and load beam 215. Load beam 215 has a first substantially rigid section 220 and a second resilient section 225 separated by a preload bend 230. Also, in preferred embodiments, gimbal 210 is preferably formed integrally with load beam 215. Resilient load beam section 225 is adapted to be coupled to a support arm 131 via a base plate 132. Substantially rigid load beam section 220 includes flanges 235 to increase the stiffness of section 220. Preload bend 230 applies a force to slider 205, through rigid load beam section 220 and gimbal 210, which opposes the hydrodynamic lifting force developed by the slider's air bearing surface (ABS) when proximate a spinning data storage disc surface.

Wires or conductors 265 are electrically connected to transducer(s) 267 on slider 205 and extend from the slider to the support arm. Protective tube or sleeve 250 surrounds wires 265 for at least a portion of the extending distance from the support arm to slider 205. The present invention includes an improved capture configuration for routing wires 265 and protective sleeve 250, for securing them to load beam 215 such that the protective sleeve and wires do not separate from the load beam during assembly of the HGA and such that the preload force applied by the load beam does not substantially change during assembly.

Resilient load beam section 225 includes capture 240 adapted to secure sleeve 250 in a longitudinally constraining manner to load beam section 225. In other words, capture 240 does not allow sleeve 250 to be displaced in the direction of a longitudinal axis of sleeve 250 in the region of the sleeve adjacent capture 240 and load beam section 225. Substantially rigid load beam section 220 includes slip captures 255 and 260 which allow longitudinal displacement (i.e., pulling or slipping) of sleeve 250 in section 220 between preload bend 230 and gimbal 210. However, captures 255 and 260 substantially constrain movement or displacement of sleeve 250 in all directions orthogonal to the longitudinal axis of the sleeve in the region of the sleeve adjacent these slip captures. Slip captures 255 and 260 positioned on rigid section 220 are separated from base plate capture 240 positioned on resilient load beam section 225 by preload bend 230.

The longitudinally constraining capture(s) 240 on the resilient portion 225 of the load beam isolate the sleeve section near the preload bend from tension and compression forces induced during handling of the HGA. Such forces can change the preload force of the HGA. The slip captures 255 and 260 on the rigid portion 220 of the load beam allow the sleeve to expand and contract, thereby preventing the development of tension and compression forces in the sleeve section near the preload bend when exposed to temperature changes. Maintaining the sleeve section near the preload bend free of such extraneous forces reduces the variation in HGA preload forces over a range of operating temperatures. Advantages of the present invention include providing an HGA having a sleeve and wire assembly routing configuration that does not allow the sleeve and wire to separate from the load beam during handling in the HGA and HSA assembly processes. The HGAs of the present invention also minimize variations in preload forces over the full range of operating temperatures of the drive. The present invention further provides the advantage of reducing the variation of preload force values for a population of HGAs following the HGA and HSA assembly processes. Also, damage to the wire conductors and sleeve during the assembly process is minimized.

Figure 4:
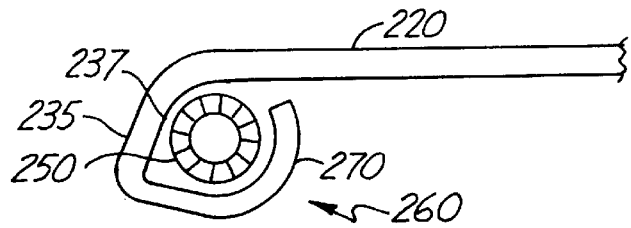
FIG. 4 is a diagrammatic illustration of a load beam slip capture in accordance with the present invention.

FIG. 4 is a diagrammatic illustration of a load beam slip capture in accordance with the present invention. Slip capture 260 can be identical to slip capture 255. Also, slip capture 255 can optionally be omitted. Slip capture 260 is preferably formed integrally with load beam section 220 and includes flange 235 which provides a first contact surface 237 against which sleeve 250 is positioned. A first capture member 270 extends from load beam flange 235 and is adapted to be wrapped around conductor sleeve 250 such that the conductor sleeve is free to displace longitudinally within capture 260, but such that the conductor sleeve is substantially laterally constrained from movement in all directions orthogonal a lateral axis of the sleeve. Thus, the aperture formed by load beam section 220, flange 235 and member 270 should be slightly larger than a cross sectional area of sleeve 250.

Figure 5:
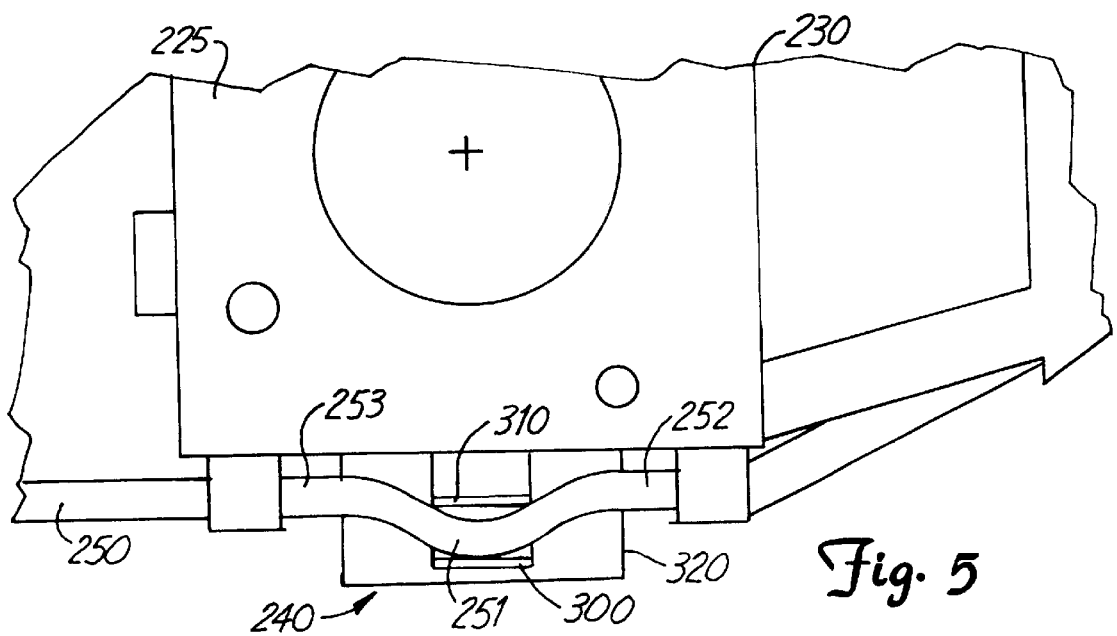
FIG. 5 is a diagrammatic illustration of a portion of a base plate attachment section of the load beam having a longitudinally constraining weave capture incorporated thereon.

FIGS. 5 and 6 are diagrammatic illustrations of a portion of resilient section 225 of load beam 215 having weave capture 240 formed thereon. Weave capture 240 constrains sleeve 250 from longitudinal displacement near section 225 and preload bend 230 of the load beam. Weave capture 240 can, in one embodiment, be formed integrally with section 225 and include lateral constraint member 300, lateral constraint member 310 and vertical constraint bridge 320. Vertical constraint bridge 320 vertically supports sleeve 250 proximate resilient section 225, while lateral constraint members 300 and 310 maintain a first portion 251 of sleeve 250 out of plane with adjacent portions 252 and 253. Weave captures of this general type are described in detail in U.S. Pat. No. 5,027,239 to Hagen entitled ROUTING A SLEEVE AND CONDUCTORS IN A HEAD-GIMBAL ASSEMBLY.

FIG. 7 is a diagrammatic illustration of a portion of resilient section 225 of load beam 215 in which weave capture 240 is replaced with a conventional crimp capture 350 which longitudinally constrains sleeve 250. Crimp capture 350 is preferably integrally formed with section 225 and includes tab member 355 adapted to be bent tightly around sleeve 250.

The present invention can be summarized in reference to the FIGS. in which a disc drive data storage system 100 and a load beam 215 are disclosed. The disc drive data storage system includes a data storage disc 105, a slider 205 having a transducer 267 formed thereon and positionable adjacent a surface 140 of the data storage disc, a gimbal 210 attached to and supporting the slider, and an actuator support arm 131. A load beam of the disc drive has a first section 220 attached to the gimbal and has a second section 225 attached to the support arm. The first and second sections 220 and 225 of the load beam are separated from one another by a preload bend 230. A conductor apparatus having at least one wire 265 electrically coupled to transducer 267 and having a conductor sleeve 250 disposed about the periphery of the at least one wire is included. The conductor sleeve 250 is physically supported by the load beam 215.

A first capture 260 slidably secures the conductor sleeve 250 to the first section 220 of the load beam 215, allowing the conductor sleeve to move in a first direction which is coincident with a longitudinal axis of the conductor sleeve, but substantially laterally constraining the conductor sleeve from moving in all directions orthogonal to the first direction. A second capture 240 or 350 secures the conductor sleeve 250 to the second section 225 of the load beam such that longitudinal displacement of the conductor sleeve adjacent the second capture is constrained by the second capture.

In some embodiments, first capture 260 includes a load beam flange 235 positioned at an edge of the first section 220 of the load beam, providing a first conductor contact surface 237 against which the conductor sleeve 250 is positioned. The first capture 260 can further include a first member 270 extending from the load beam flange 235 and adapted to be wrapped around the conductor sleeve 250 such that the conductor sleeve is free to displace longitudinally in the first direction, but such that the conductor sleeve is substantially laterally constrained from movement in all directions orthogonal to the first direction. In some embodiments, the load beam flange 235 and the member 270 are formed integrally with the load beam.

In some embodiments, second capture 240 is a weave capture. In other embodiments, the second capture 350 is a crimp capture. The weave or crimp captures can be formed integrally with the load beam.

In some embodiments of the present invention, the disc drive data storage system and load beam further include a third capture 255 slidably securing the conductor sleeve 250 to the first section 220 of the load beam. The third capture 255 allows the conductor sleeve 250 to move in a first direction which is coincident with a longitudinal axis of the conductor sleeve. The first capture substantially laterally constrains the conductor sleeve from moving in all directions orthogonal to the first direction.

In some embodiments, the gimbal of disc drive data storage 100 and HGA 135 is formed integrally with the load beam. The second section 225 of the load beam is attached to the support arm 131 by a base plate 132.

The present invention includes a load beam 215 adapted for coupling a gimbal 210 to a support arm 131 in a data storage system and for supporting a conductor sleeve 250 running from the support arm to a location proximate the gimbal. The load beam includes a resilient section 225 having a first end adapted for attachment to the support arm and having a second end. The load beam also includes a substantially rigid section 220 having a first end coupled to the second end of the resilient section and having a second end adapted for attachment to the gimbal 210. The resilient and substantially rigid sections are separated from one another by a preload bend 230 in the load beam. A first slide capture 260 is adapted to slidably secure the conductor sleeve 250 to the rigid section 220 of the load beam. While slidably securing the conductor sleeve 250 to the rigid section 220 of the load beam, the first slide capture 260 allows the conductor sleeve to move longitudinally therethrough in a first direction which is coincident with a longitudinal axis of the conductor sleeve proximate the first slide capture, while substantially constraining the conductor sleeve from moving in all directions orthogonal to the first direction. A first longitudinal inhibiting capture 240 or 350 is adapted to secure the conductor sleeve 250 to the resilient section 225 of the load beam such that longitudinal displacement of the conductor sleeve proximate the first longitudinal inhibiting capture is constrained.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is at times described as a disc drive data storage system, it will be appreciated by those skilled in the art that the teachings of the present invention can be applied to other systems and apparatus, such as optical storage systems, without departing from the scope and spirit of the present invention.

What is claimed is:

1. A load beam adapted for coupling a gimbal to a support arm in a data storage system and for supporting a conductor sleeve running from the support arm to a location proximate the gimbal, the load beam comprising:

a resilient section having a first end adapted for attachment to the support arm and having a second end;

a substantially rigid section having a first end coupled to the second end of the resilient section and having a second end adapted for attachment to the gimbal, wherein the resilient and substantially rigid sections of the load beam are separated from one another by a preload bend in the load beam;

a first slide capture adapted to slidably secure the conductor sleeve to the rigid section of the load beam, wherein when slidably securing the conductor sleeve to the rigid section of the load beam, the first slide capture allows the conductor sleeve to move longitudinally therethrough in a first direction which is coincident with a longitudinal axis of the conductor sleeve proximate the first slide capture, while substantially constraining the conductor sleeve from moving in all directions orthogonal to the first direction; and a first longitudinal inhibiting capture adapted to secure the conductor sleeve to the resilient section of the load beam such that longitudinal displacement of the conductor sleeve proximate the first longitudinal inhibiting capture is constrained.

2. The load beam of claim 1, wherein the first slide capture includes a load beam flange positioned at an edge of the substantially rigid section of the load beam and adapted to provide a first conductor sleeve contact surface against which the conductor sleeve is positioned.

3. The load beam of claim 2, wherein the first slide capture further includes a first member extending from the load beam flange and adapted to be wrapped around the conductor sleeve such that the conductor sleeve is free to displace longitudinally in the first direction, but such that the conductor sleeve is substantially laterally constrained from movement in all directions orthogonal to the first direction.

4. The load beam of claim 3, wherein the load beam flange and the first member are formed integrally with the load beam.

5. The load beam of claim 4, wherein the first longitudinal inhibiting capture is a weave capture.

6. The load beam of claim 4, wherein the first longitudinal inhibiting capture is a crimp capture.

7. The load beam of claim 4, and further comprising a second slide capture adapted to slidably secure the conductor sleeve to the rigid section of the load beam, wherein when slidably securing the conductor sleeve to the rigid section of the load beam, the second slide capture allows the conductor sleeve to move longitudinally therethrough in a second direction which is coincident with a longitudinal axis of the conductor sleeve proximate the second slide capture, while substantially constraining the conductor sleeve from moving in all directions orthogonal to the second direction.

8. A disc drive data storage system comprising:
- a slider having a transducer formed thereon and positionable adjacent a surface of a data storage disc;
- a gimbal attached to and supporting the slider;
- an actuator support arm;
- a load beam having a first section attached to the gimbal and having a second section attached to the support arm, the first and second sections of the load beam being separated from one another by a preload bend in the load beam;
- a conductor apparatus having at least one wire electrically coupled to the transducer and a conductor sleeve disposed about a periphery of the at least one wire for a portion of a length of the at least one wire, the conductor sleeve being physically supported by the load beam;
- a first capture slidably securing the conductor sleeve to the first section of the load beam, the first capture allowing the conductor sleeve to move in a first direction which is coincident with a longitudinal axis of the conductor sleeve, the first capture substantially laterally constraining the conductor sleeve from moving in all directions orthogonal to the first direction; and
- a second capture securing the conductor sleeve to the second section of the load beam such that longitudinal displacement of the conductor sleeve is constrained by the second capture.

9. The disc drive data storage system of claim 8, wherein the first capture includes a load beam flange positioned at an edge of the first section of the load beam and providing a first conductor contact surface against which the conductor sleeve is positioned.

10. The disc drive data storage system of claim 9, wherein the first capture further includes a first member extending from the load beam flange and adapted to be wrapped around the conductor sleeve such that the conductor sleeve is free to displace longitudinally in the first direction, but such that the conductor sleeve is substantially laterally constrained from movement in all directions orthogonal to the first direction.

11. The disc drive data storage system of claim 10, wherein the load beam flange and the member are formed integrally with the load beam.

12. The disc drive data storage system of claim 8, wherein the second capture is a weave capture.

13. The disc drive data storage system of claim 12, wherein the second capture is formed integrally with the load beam.

14. The disc drive data storage system of claim 8, wherein the second capture is a crimp capture.

15. The disc drive data storage system of claim 14, wherein the second capture is formed integrally with the load beam.

16. The disc drive data storage system of claim 8, and further comprising a third capture slidably securing the conductor sleeve to the first section of the load beam, the third capture allowing the conductor sleeve to move in a first direction which is coincident with a longitudinal axis of the conductor sleeve, the first capture substantially laterally constraining the conductor sleeve from moving in all directions orthogonal to the first direction.

17. The disc drive data storage system of claim 8, wherein the gimbal is formed integrally with the load beam.

18. The disc drive data storage system of claim 8, wherein the second section of the load beam is attached to the support arm by a base plate.

* * * * *